US007257407B2

United States Patent
Dacosta et al.

(10) Patent No.: US 7,257,407 B2
(45) Date of Patent: Aug. 14, 2007

(54) SYSTEM AND METHOD FOR DYNAMICALLY ALLOCATING DATA RATES AND CHANNELS TO CLIENTS IN A WIRELESS NETWORK

(75) Inventors: Behram Mario Dacosta, San Diego, CA (US); David Alan Desch, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/397,441

(22) Filed: Mar. 26, 2003

(65) Prior Publication Data

US 2004/0192322 A1  Sep. 30, 2004

(51) Int. Cl.
*H04Q 7/20* (2006.01)
(52) U.S. Cl. ............... 455/452.1; 455/452.2; 455/450; 370/468
(58) Field of Classification Search ........ 455/450, 455/451, 452.2, 455, 452.1; 370/337, 338, 370/347, 468
See application file for complete search history.

(56) References Cited

U.S. PATENT DOCUMENTS

| | | | | |
|---|---|---|---|---|
| 5,249,290 A | * | 9/1993 | Heizer | 718/105 |
| 6,480,506 B1 | * | 11/2002 | Gubbi | 370/468 |
| 6,647,058 B1 | * | 11/2003 | Bremer et al. | 375/222 |
| 6,738,363 B1 | * | 5/2004 | Best et al. | 370/329 |
| 6,748,220 B1 | * | 6/2004 | Chow et al. | 455/450 |
| 2002/0071445 A1 | * | 6/2002 | Wu et al. | 370/441 |
| 2004/0121749 A1 | * | 6/2004 | Cui et al. | 455/226.1 |
| 2004/0125779 A1 | * | 7/2004 | Kelton et al. | 370/338 |
| 2004/0125799 A1 | | 7/2004 | Kelton et al. | |
| 2004/0203383 A1 | * | 10/2004 | Kelton et al. | 455/41.2 |

* cited by examiner

*Primary Examiner*—Duc M. Nguyen
*Assistant Examiner*—Anthony S. Addy
(74) *Attorney, Agent, or Firm*—Blakely, Sokoloff, Taylor & Zafman LLP (57) ABSTRACT

Disclosed is a system, apparatus, and method for dynamically allocating wireless channels in a wireless network. At least two client devices are present in the wireless network. Each client device is capable of transceiving wireless data over a wireless channel. In one embodiment, a server capable of a transceiving wireless data over at least one wireless channel determines the number of client devices in the wireless network. The server allocates client devices to different wireless channels. Particularly, client devices that receive data at substantially different data rates are allocated to different wireless channels in order to optimize the total system utility of the wireless network. Furthermore, client devices that receive data at substantially similar data rates are allocated to the same wireless channel.

30 Claims, 4 Drawing Sheets

| CLIENT | POWER % (OF MAXIMUM) | DATA RATE | |
|---|---|---|---|
| A | 25 | 6 | |
|   | 50 | 12 | 405 |
|   | 75 | 12 | |
|   | 100 | 12 | |
| B | 25 | 3 | |
|   | 50 | 3 | 410 |
|   | 75 | 6 | |
|   | 100 | 6 | |
| C | 25 | 18 | |
|   | 50 | 48 | 415 |
|   | 75 | 48 | |
|   | 100 | 54 | |
| D | 25 | 36 | |
|   | 50 | 36 | 420 |
|   | 75 | 36 | |
|   | 100 | 36 | |

FIG. 4

| CLIENT | SINGLE CHANNEL DATA RATE (MBPS) | DUAL CHANNEL DATA RATE (MBPS) |
|---|---|---|
| A | 3 | 6 |
| B | 1.5 | 1.5 |
| C | 13.5 | 24 |
| D | 9 | 18 |
| TOTAL | 27 | 49.5 |

FIG. 5

SYSTEM AND METHOD FOR DYNAMICALLY ALLOCATING DATA RATES AND CHANNELS TO CLIENTS IN A WIRELESS NETWORK

FIELD OF THE INVENTION

The present invention relates generally to wireless communications and, more particularly, to a system and method for dynamically allocating data rates and channels to clients in a wireless network to optimize the total system utility of the wireless network.

BACKGROUND OF THE INVENTION

Over the last decade or so, for many businesses, it has become a necessity for employees to share data over an enterprise network featuring one or more local area networks. To improve efficiency, enhancements have been added to local area networks such as remote wireless access. This enhancement provides an important extension in forming a wireless local area network (WLAN).

Further, home networks including wireless home-networks, similar to WLAN's, have become increasingly popular. For example, in wireless home-networks, a home media server streams data, such as video and audio data, to client devices throughout the home. Better Quality of Service (QoS), and better bandwidth, allows the server to stream high fidelity content, such as video, movies, television, etc. to client devices throughout the house. Hence, it is important to optimize QoS and network bandwidth, which is particularly important for unreliable and lower-bandwidth networks, such as wireless networks. WLAN's and wireless home-networks, as well as other types of wireless networks, will be generally referred to as wireless networks.

Typically, wireless networks support communications between a station or server and wireless clients, and among the various wireless clients themselves, utilizing access points (APs). In general, each AP operates as a relay station by supporting communications between the wireless clients themselves and between the wireless clients and the server. Further, data transmitters within a wireless network, such as data transmitters operating using an Institute of Electrical and Electronics Engineers (IEEE) 802.11 wireless protocol, can transmit data at different rates to different clients. Oftentimes, the data transmitters (e.g. including an antenna), are included as part of an access point.

Farther clients (i.e. from the transmitter), operating with a more error prone link, may be sent data using a robust modulation method such as 16-QAM (i.e. 16 Quadrature Amplitude Modulation (QAM)). On the other hand, a closer client (i.e. to the transmitter) with a more reliable link may be sent data at a higher rate, e.g. 64-QAM, which is less robust but is capable of a higher data rate. The problem is, that in many systems, both such data transmissions are effectively time-division multiplexed on the same frequency channel, which may result in inadequate bandwidth for some of the data transmission being multiplexed. For example, a slow data rate channel (e.g. the 16-QAM channel) may occupy, for example, 75% of the channel, which may not leave adequate bandwidth for a faster data rate channel (e.g. the 64-QAM channel). Accordingly, the overall performance of the wireless network is degraded.

SUMMARY OF THE INVENTION

Disclosed is a system, apparatus, and method for dynamically allocating wireless channels in a wireless network. At least two client devices are present in the wireless network. Each client device is capable of transceiving wireless data over a wireless channel. In one embodiment, a server capable of a transceiving wireless data over at least one wireless channel determines the number of client devices in the wireless network. The server allocates client devices to different wireless channels. Particularly, client devices that receive data at substantially different data rates are allocated to different wireless channels in order to optimize the total system utility of the wireless network. Furthermore, client devices that receive data at substantially similar data rates are allocated to the same wireless channel.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the embodiments of the invention, it will be apparent to one skilled in the art that these specific details are not required in order to practice the embodiments of the invention. In other instances details such as, well-known methods, types of data, protocols, procedures, components, electrical structures and circuits, are not described in detail, or are shown in block diagram form, in order not to obscure the invention. Furthermore, embodiments of the invention will be described in particular embodiments, but may be implemented in hardware, software, firmware, middleware, or a combination thereof.

Herein, embodiments of the invention may be applicable to a variety of wireless networks such as a wireless local area network (WLAN), a wireless personal area network (WPAN) and/or a wireless home-network, as well as other types of wireless networks. These types of networks will be generally referred to as wireless networks. For example, the wireless network may be configured in accordance with any Institute of Electrical and Electronics Engineers (IEEE) 802.11 standard such as an IEEE 802.11b standard entitled "Wireless LAN Medium Access Control (MAC) and Physical Layer (PHY) specifications: Higher-Speed Physical Layer Extension in the 2.4 GHz Band" (IEEE 802.11b, 1999), an IEEE 802.11a standard entitled "Wireless LAN Medium Access Control (MAC) and Physical Layer (PHY) specifications: High-Speed Physical Layer in the 5 GHz Band" (IEEE 802.11a, 1999) or a revised IEEE 802.11 standard "Wireless LAN Medium Access Control (MAC) and Physical Layer (PHY) specifications" (IEEE 802.11, 1999). Of course, the invention may be compliant with systems configured in accordance with High Performance Radio Local Area Networks (HiperLAN) or subsequently published specifications.

In the following description, certain terminology is used to describe features of the invention. For example, a "component", or "computing device", or "client device", or "computer" includes hardware and/or software module(s) that are configured to perform one or more functions. Further, a "processor" is logic that processes information. Examples of a processor include a microprocessor, an application specific integrated circuit, a digital signal processor, a micro-controller, a finite state machine, or even combinatorial logic.

A "software module" is executable code such as an operating system, an application, an applet or even a routine. Software modules may be stored in any type of memory, namely suitable storage medium such as a programmable electronic circuit, a semiconductor memory device, a volatile memory (e.g., random access memory, etc.), a non-volatile memory (e.g., read-only memory, flash memory, etc.), a floppy diskette, an optical disk (e.g., compact disk or digital versatile disc "DVD"), a hard drive disk, tape, or any kind of interconnect (defined below).

An "interconnect" or "link" is generally defined as an information-carrying medium that establishes a communication pathway. Examples of the medium include a physical medium (e.g., electrical wire, optical fiber, cable, bus traces, etc.) or a wireless medium (e.g., air in combination with wireless signaling technology).

"Information" or "data stream" is defined as data, address, control or any combination thereof. For transmission, information may be transmitted as a message, namely a collection of bits in a predetermined format. One particular type of message is a frame including a header and a payload, each having a predetermined number of bits of information.

Embodiments of the invention relate to a system, apparatus, and method for dynamically allocating wireless channels in a wireless network. At least two client devices are present in the wireless network. Each client device is capable of transceiving wireless data over a wireless channel. In one embodiment, a server capable of a transceiving wireless data over at least one wireless channel determines the number of client devices in the wireless network. The server allocates client devices to different wireless channels. Particularly, client devices that receive data at substantially different data rates are allocated to different wireless channels in order to optimize the total system utility of the wireless network. Furthermore, client devices that receive data at substantially similar data rates are allocated to the same wireless channel. Also, it should be noted that the client devices themselves may also implement aspects of the present invention in order dynamically allocate wireless channels in the wireless network.

Figure 1A:
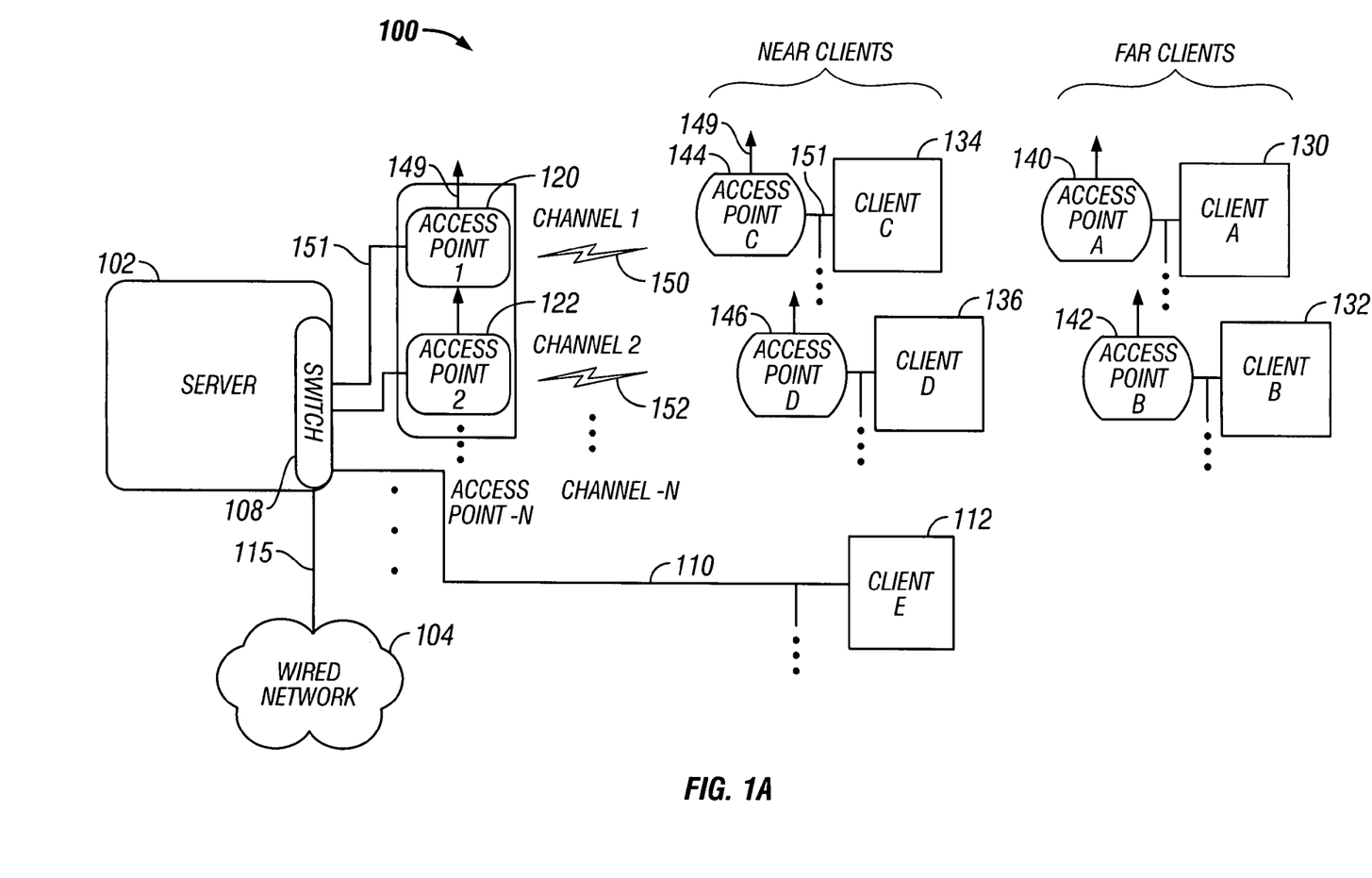
FIG. 1A shows an example of a wireless network in accordance with one embodiment of the present invention.

With reference now to FIG. 1A, FIG. 1A shows an example of a wireless network 100 in accordance with one embodiment of the present invention. Herein, exemplary wireless network 100 includes a station or server 102 that may communicate with a plurality of clients and with one or more other wired networks 104 (e.g. a LAN, cable network, Internet, etc.). Particularly, in this example, server 102 through switch 108 may communicate via link 110 to client device E 112. For example, link 110 may be a wired type link in accordance with an Ethernet standard. It should be appreciated, and as particularly shown in FIG. 1A, that link 110 may couple to any number of client devices. Further, server 102 through switch 108 may communicate via link 115 to another wired network 104 (e.g. a LAN, cable network, Internet, etc.). For example, link 115 may be a wired type link in accordance with an Ethernet standard.

Furthermore, server 102 through switch 108 may be coupled to access points 1 and 2, 120 and 122, to communicate with client device A 130, client device B 132, client device C 134, and client device D 136 through access point A 140, access point B 142, access point C 144, access point D 146, respectively, via wireless channels 1 and 2, 150 and 152, respectively, as will be discussed. Clients A, B, C, D are each of course in communication with their respective access point.

Moreover, it should be noted that instead of client devices A, B, C, D utilizing access points, that the network may instead comprise non-access point wireless client devices. For example, these non-access point wireless client devices may be utilized as part of an "Ad-hoc" type network (e.g. in accordance with IEEE 802.11 terminology) and the non-access point wireless client devices would be termed "stations" in 802.11 terminology. In this embodiment, the client devices would include suitable wireless network interface cards (e.g. PCI, PCMI, etc., type cards) employed within, or possibly separate from, the wireless client device to transceive and process wireless information to and from the wireless client device. A wireless network interface card (NIC) component typically includes an antenna, a receive (RX) interface, a transmit (TX) interface, and a converter. The converter may be implemented as a component that can perform both analog-to-digital signal conversion as well digital-to-analog conversion. Although, a wireless NIC typically comprises a wireless transceiver, it is of course contemplated that the wireless NIC may feature only RX or TX functionality such that only a receiver or transmitter is implemented. In any event, it should be appreciated by those skilled in the art that the embodiments of present invention may be used in conjunction with either access-point type wireless client devices or non-access point wireless client devices (e.g. "stations" in 802.11 terminology).

As shown in FIG. 1A, access points 1 and 2 120 and 122 and access points A, B, C, D 140, 142, 144, and 146 support bi-directional communications by (i) receiving data frames from clients A, B, C, D 130, 132, 134, 136 and transmitting data from these frames onto a physical medium such as link 110 to other client devices (e.g. client E 112) and/or link 115 to wired network 104 and (ii) receiving data from wired network 104 and other client devices (e.g. client E 112) and transmitting data frames to one or more targeted clients A, B, C, D 130, 132, 134, 136. Each of the access points includes a respective antenna 149 to transceive wireless information and a link 151 to transceive the information to client devices, components, or other networks.

Wired network 104 can be of any type of wired network, including but not limited or restricted to Ethernet, Token Ring, Asynchronous Transfer Mode (ATM) or the like.

Moreover, wired network 104 and clients accessible by link 110 feature resources that are available for users of wireless network 100. Such resources may include devices for data storage, which are coupled to links 110 and/or 115.

It should be appreciated that, in one embodiment, client devices A, B, C, D 130, 132, 134, 136 communicate with and access information from server 102 via their respective access points over the air in accordance with an IEEE 802.11 communications protocol or another wireless networking protocol. Hence, access points 1 and 2 120, 122 and access points A, B, C, D 140, 142, 144, 146 each generally operate as a transparent bridge connecting both a wireless network including clients A, B, C, D 130, 132, 134, 136 through server 102 to wired networks, for example the LAN network including client device E 112 and possibly other clients and/or wired network 104.

In the example of wireless network 100 of FIG. 1A, the client devices are grouped as far clients, clients A and B 130 and 132, which are relatively far from access points 1 and 2 120 and 122 of the server 102, and near clients, clients C and D 134 and 136, which are relatively near to the access points 1 and 2 of the server 102. The relevance of this grouping will be discussed in more detail later. Further, access points 1 and 2 120 and 122 will sometimes be generally referred to as transmitters 120 and 122 to aid in the ease of description.

It should be appreciated that access point A 140 may communicate and support a plurality of other far clients in addition to client A 130, as indicated in FIG. 1A. Access point B 142 may also communicate and support a plurality of other far clients in addition to client B 132, as indicated in FIG. 1A. Similarly, access point C 144 may communicate and support a plurality of other near clients in addition to client C 134, as indicated in FIG. 1A. Additionally, access point D 146 may also communicate and support a plurality of other near clients in addition to client D 136, as indicated in FIG. 1A.

Figure 1B:
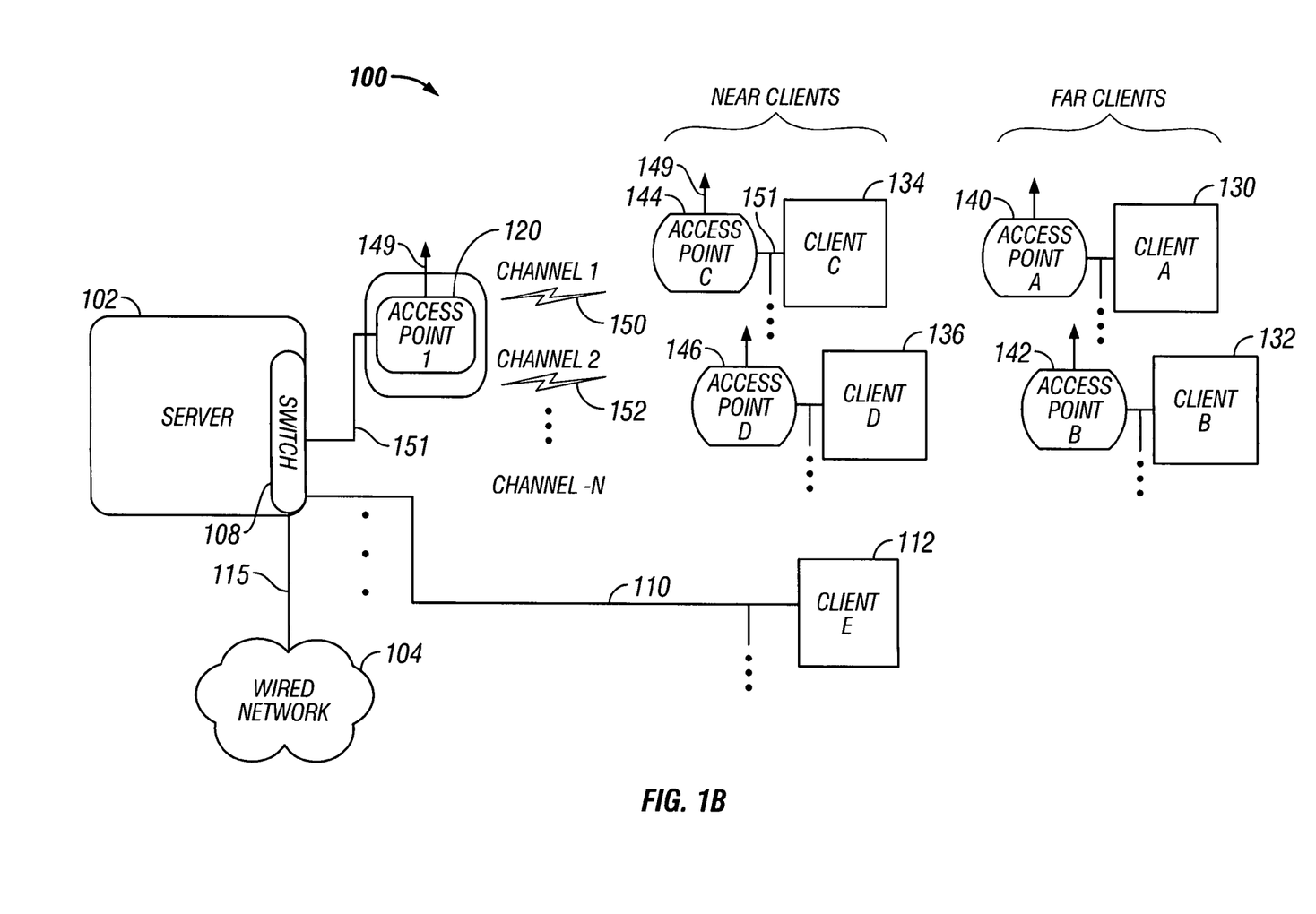
FIG. 1B shows another example of the wireless network of FIG. 1A, in which an access point supports a plurality of different wireless channels.

Further, it should be appreciated that FIG. 1A is only an example of one type of configuration of a wireless network in which embodiments of the invention may be practiced, as will be discussed. Any number of access points and client devices and configurations thereof may be utilized. Furthermore, the server 102 may utilize any number of access points (e.g. access points 1-N), as indicated in FIG. 1A, and may communicate utilizing any number of wireless channels (e.g. wireless channels 1-N), as indicated in FIG. 1A. Moreover, each access point may support one wireless channel or may support any number of wireless channels, dependent upon the configuration of the wireless network. For example, FIG. 1B illustrates an example of an access point 120 supporting a plurality of different wireless channels (e.g. wireless channels 1-N). Additionally, it should be appreciated that server 102 may be connected to any number of other wired or wireless networks. Thus, the particular configurations of the wireless networks 100 disclosed in FIGS. 1A and 1B are only used as examples in which to discuss the embodiments of the invention, and should not be used to attempt to limit the embodiments of the invention.

Also, it should be appreciated that the client devices A-E of the wireless network 100 may be any type of hardware and/or software based computing component or device or electronic component or device such as a computer (e.g. desktop, notebook, server), personal digital assistant "PDA", telephone, alphanumeric pager, television (standard, digital, high-definition, etc.), set-top box, etc. It should be appreciated that this list is only a small exemplary list of all the possible types of clients that can be part of the wireless network 100. Many other types of client devices should be apparent to those of skill in the art.

Figure 2:
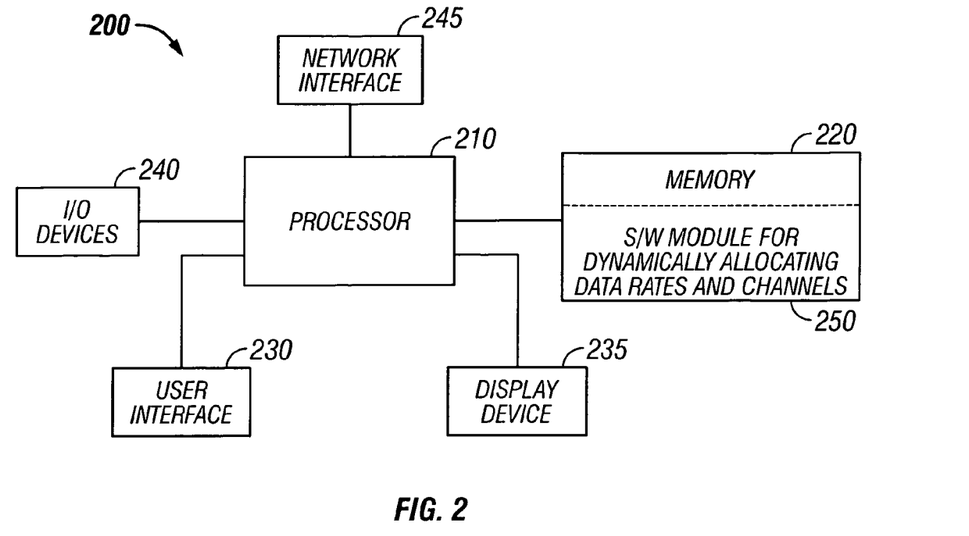
FIG. 2 shows a diagram of an example of a station or a server of FIG. 1A or 1B, which may be utilized in practicing one embodiment of the present invention.

Turning now to FIG. 2, FIG. 2 shows a diagram of an example of the station or server of FIG. 1A or 1B, which may be utilized to practice one embodiment of the present invention. Referring to FIG. 2, in one embodiment, the station or server 102 may include a processor 210, a memory 220, a user interface 230 (e.g. a keyboard, mouse, etc.), a display device (e.g. a monitor, LCD display, etc.) 235, a plurality of input/output (I/O) devices 240 and a network interface 245 which may comprise part of switch 108.

Examples of the processor 210 that may be utilized include a microprocessor, an application specific integrated circuit, a digital signal processor, a micro-controller, a finite state machine, or even combinatorial logic. Examples of P/O devices 240 may include any I/O device to perform 1/O functions. For example, I/O devices may include a printer, storage devices (e.g. Compact Disk ROM (CD ROM), Digital Video Disk (DVD), hard drive, floppy drive, etc.) or any other types of P/O devices, e.g., controllers for input devices (mouse, trackball, pointing device), media cards (e.g. audio, video, graphics), etc. The switch 108 including network interface 245 may include suitable network interface cards to interface with the access points 120 and 122 of the wireless network 100, the wired network 104, client devices, and the Ethernet network (link 110), as previously discussed, as well other types of networks, interfaces, and client devices.

Further, memory 220 may include a software module 250 for dynamically allocating data rates and channels to clients in a wireless network to optimize the total system utility of the wireless network, in order to implement embodiments of the present invention, as will be discussed in more detail later. The software module 250 includes executable code such as an operating system, an application, an applet or even a routine. The software module 250 may be stored in memory 220, which may be any type of memory, namely a suitable storage medium such as a programmable electronic circuit, a semiconductor memory device, a volatile memory (e.g., random access memory, etc.), a non-volatile memory (e.g., read-only memory, flash memory, etc.), a floppy diskette, an optical disk (e.g., compact disk or digital versatile disc "DVD"), a hard drive disk, tape, etc. Further, in alternative embodiments, one or more client devices (e.g. client devices A, B, C, and D) may store a software module to dynamically allocate data rates and channels to clients in a wireless network to optimize the total system utility of the wireless network, in addition to or in place of the server 102.

It should be appreciated that embodiments of the present invention can be practiced with any sort of station, client device, server computer, general purpose computer, or any sort of computing or electronic device that includes circuitry capable of processing data. In particular, embodiments of the invention can be generally implemented in a computer as one or more software modules or computer programs to perform the desired functions. The computer programs are comprised of machine-readable instructions (e.g. code segments) which when read and executed by the computer, cause the computer to perform the operations necessary to implement and/or use the present invention. Generally, the computer programs are tangibly embodied in and/or readable from a device, carrier, or media, such as memory, data storage devices, and/or a remote device coupled to the computer via data communication devices. The computer programs may be loaded from memory, data storage devices, and/or remote devices into the memory of the computer for use during operations.

It should be appreciated by those skilled in the art that the FIG. 2 computer system configuration 200 is only one example of a basic computer system for use as a station or server. Further, those skilled in the art will recognize that the exemplary embodiment illustrated in FIG. 2 is not intended to limit the embodiments of the invention.

Moreover, while aspects of the invention and various functional components have been described in particular embodiments, it should be appreciated these aspects and functionalities can be implemented in hardware, software, firmware, middleware or a combination thereof Referring again to FIG. 1A, the wireless network 100, previously discussed, may be utilized as a network (e.g. a WLAN) by itself or may be part of a larger network for use by a business or for use in the home, or for use by any other entity. In one aspect, the wireless network 100 according to embodiments of the present invention provides for the efficient streaming of information and data for multi-media data, video, audio, graphics, text, documents, etc., utilizing multiple channels 150 and 152. Further, embodiments of the present invention provide for the efficient streaming of high fidelity video and audio data such as for movies, television, etc. Particularly, in one embodiment, when utilized as part of a home-network, the home media server 102 streams data, such as video and audio data, to client devices A, B, C, D 130, 132, 134, 136 throughout the home with high QoS and high bandwidth such that the server can efficiently stream high fidelity content, such as video, movies, television, etc., to client devices throughout the household.

In one embodiment of the present invention, data rates and transmit power levels are dynamically allocated to multiple channels 150 and 152 in order to maximize the total system utility of the wireless network 100. Particularly, for each channel, each client's use of the channel is selected to maximize the total system utility of the wireless network 100. For example, higher data rate channels are typically assigned to a separate wireless channel, e.g. channel 150.or 152, so that they are not limited in transmit time by the lower data rate channel. More particularly, because regulatory agencies often limit the total emitted power of a given channel and/or frequency band, transmit power levels are also assigned to each channel being used (e.g. channel 150 or 152) in order to maximize bandwidth and more specifically the total system utility of the wireless network.

Using FIG. 1A only for explanatory purposes, an example will be given to clarify the typical problem with present low data rate wireless networks that only utilize one channel. In a typical wireless network, the server 102 wirelessly streams data to both far clients, e.g. clients A and B 130 and 132, and near clients, e.g. clients C and D 134 and 136, along a single channel at a different data rate for each client. As an example, based on streaming data from the server 102: client A 130 receives a data stream using a modulation method that provides data at 12 Mbps; client B 132 receives a data stream using a modulation method that provides data at 6 Mbps; client C 134 receives a data stream using a modulation method that provides data at 48 Mbps; and client D 136 receives a data stream using a modulation method that provides data at 48 Mbps. It is assumed in this example that each of the other clients cannot receive data at any higher data rate, because a higher modulation method would result in unacceptable error rates.

Thus, assuming an equal probability of access to the one wireless channel from server 102, each client A, B, C, and D denoted 130, 132, 134 and 136, respectively, will only be entitled to a 25% channel usage. Hence, client A 130 may only receive a data stream at a maximum bandwidth of 3 Mbps, client B 133 may only receive a data stream at a maximum bandwidth of 1.5 Mbps, client C 134 may only receive a data stream at a maximum bandwidth of 12 Mbps, and client D 136 may only receive a data stream at a maximum bandwidth of 12 Mbps. Accordingly, the total channel bandwidth of the one wireless channel is a maximum of 28.5 Mbps. It should be noted that the actual data bandwidth may be less due to protocol overhead, retransmission, etc. Unfortunately, from this perspective of the higher data rate capable clients, such as clients C and D, potentially valuable time in the one wireless channel has been under utilized by the lower data rate clients A and B.

In order to remedy this, embodiments of the invention provide for dynamically allocating data rates and transmit power levels to multiple wireless channels, e.g. wireless channels 150 and 152, in order to maximize the total system utility of the wireless network 100. Particularly, for each channel, each client's use of a channel is selected to maximize the total system utility of the wireless network. For example, higher data rate channels are typically assigned to a separate wireless channel, e.g. wireless channel 150 or 152, so that they are not limited in transmit time by the lower data rate channel. More particularly, because regulatory agencies often limit the total emitted power of a given channel or all channels in a particular band, transmit power levels are also assigned to each channel being used (e.g. wireless channel 150 or 152) in order to maximize bandwidth and more specifically the total system utility of the wireless network.

Further, when calculating the overall system utility, client priority may also be considered. For example, each client device may be assigned a priority level. The total system utility is then calculated by scaling each data rate associated with each client's priority, before adding together all such scaled values to determine the total system utility. In this example, client priority may be determined by the user and/or based upon the type of client device being utilized. It should be appreciated that many other factors may be considered in determining client priority.

Figure 3:
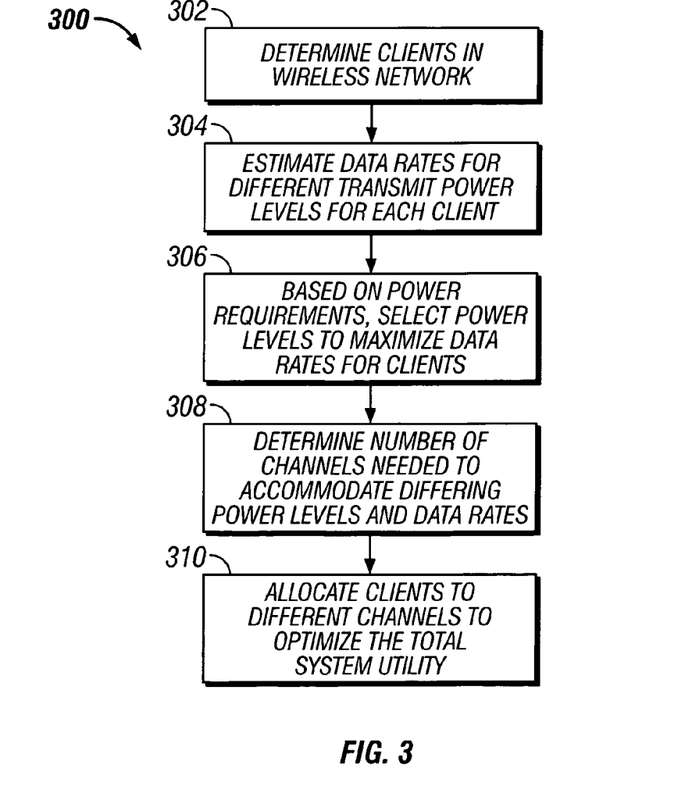
FIG. 3 shows a flow diagram that illustrates operations that may be performed to dynamically allocate data rates and channels to clients in a wireless network to optimize the total system utility of the wireless network, according to one embodiment of the present invention.

With reference also to FIG. 3, a flow diagram 300 illustrates the operations that may be performed to dynamically allocate data rates and wireless channels to clients in a wireless network to optimize the total system utility of the wireless network, according to one embodiment of the present invention. Initially, the clients in the wireless system are determined (block 302). For example, clients A, B, C, and D denoted 130, 132, 134 and 136, respectively, would be determined to be the wireless clients of the wireless network 100. Next, data rates for different transmit power levels are estimated for each client such as clients A, B, C, and D denoted 130, 132, 134 and 136, respectively (block 304). Based on power requirements set by regulatory agencies and/or for safety reasons, power levels are selected to maximize data rates to clients (block 306). Further, a number of different wireless channels (e.g. wireless channels 1 and 2, 150 and 152) are determined to accommodate the differing power levels and data streams (block 308). The clients are then allocated to different wireless channels to optimize the total system utility of the wireless network 100 (block 310). Particularly, client devices that receive data at substantially different data rates are allocated to different wireless channels, and client devices that receive data at substantially similar data rates are allocated to the same wireless channels.

As will be discussed in more detail later, far clients A and B 130 and 132 are grouped together and allocated to a channel (e.g. wireless channel 1 150) and near clients C and D 134 and 136 are grouped together and allocated to a channel (e.g. wireless channel 2 152), based on similar power levels and similar data rates. This grouping optimizes the total system utility of the wireless network 100.

It should be appreciated that the operations to dynamically allocate data rates and different channels to clients in a wireless network to optimize the total system utility of the wireless network, previously described with reference to FIG. 3, in one embodiment, may be implemented in a computing device having a software module to aid in implementing these functions. Particularly, in one embodiment, a computing device such as station or server 102, previously described with reference to FIG. 2, may utilize a software module 250 stored in memory 220 implemented under the control the processor 210, as previously discussed, to implement these functions.

Aspects of the previously described operations of FIG. 3 will now be discussed in more detail, with reference to FIG. 1A. As previously discussed, first, clients A, B, C, and D denoted 130, 132, 134 and 136, respectively, are determined to be clients of the wireless network 100. Next, data rates for different transmit power levels are estimated for each client A, B, C, and D denoted 130,132, 134 and 136, respectively. This may be accomplished in a number of different ways.

For example, a probing method may be used. In the probing method actual data packets may be sent to each of the clients (e.g. clients A, B, C, and D denoted 130, 132, 134 and 136, respectively) from the server 102 at different transmit power levels to estimate acceptable data rates and throughputs for given power levels.

In another method, feedback may be measured from clients (e.g. clients A, B, C, and D denoted 130, 132, 134 and 136, respectively) to indicate the bit error rate (BER) and signal-to-noise ratio (SNR) from previous data packets. Because the server 102 knows the transmit power of the previous packet, the server 102 can determine the relationship between the client's SNR and transmit power for the current propagation path of data packets between the server and client. Using this relationship, the server 102 can estimate the BER vs. the transmit power for a plurality of different transmit power levels, to estimate acceptable data rates and throughputs for given power levels. It should be appreciated by those skilled in the art that a number of other methods are equally applicable to estimate acceptable data rates and throughputs for given power levels.

Figure 4:
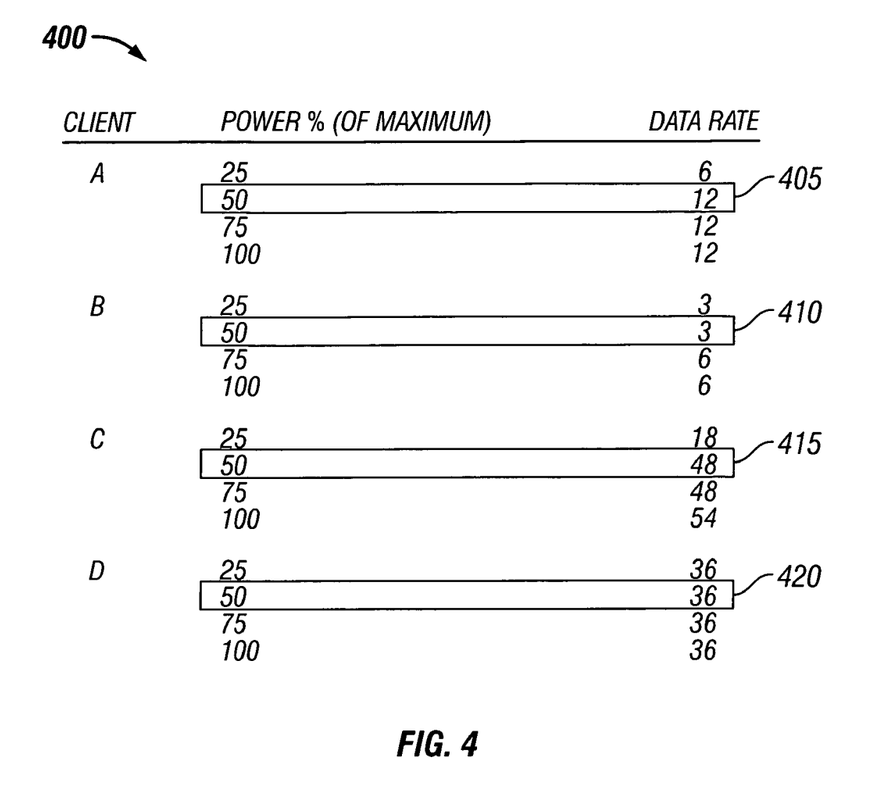
FIG. 4 illustrates a table showing an example of data rates for clients A, B, C, and D, that each client is capable of supporting at different transmit power levels, for the exemplary wireless network.

Continuing with the present example, and with reference also to FIG. 4, FIG. 4 illustrates a table 400 showing an example of data rates for clients A, B, C, and D that each client is capable of supporting at different transmit power levels for the exemplary wireless network 100. These data rates for each client for different power levels can be estimated utilizing the techniques previously discussed. Particularly, it should be noted that in FIG. 4, power is denoted as a power percentage of the maximum transmit power level and data rates are in Mbps. As can be seen in FIG. 4, relatively far clients A and B 130 and 132 have relatively low data rates in Mbps for the percentage of transmit power levels, and relatively near clients C and D 134 and 136 have relatively high data rates in Mbps for the percentage of transmit power levels.

Utilizing the data rates and transmit power levels of FIG. 4, it can be seen that by allocating clients to different wireless channels to optimize total system utility, that the total data rate and corresponding bandwidth can be increased. As previously discussed, in the prior example of present day systems, typically only one wireless channel would be used to support clients A, B, C, and D denoted 130, 132, 134 and 136, respectively, such that each client would only be entitled to a 25% channel usage.

In contrast, according to embodiment of the present invention: based on power requirements, power levels are selected to maximize data rates for clients; a number of wireless channels are determined that are needed to accommodate the differing power levels and data rates; and clients are allocated to different wireless channels to optimize the total system utility based upon similar data rates for the wireless network 100. In the present example, in the wireless network 100, far clients A and B 130 and 132 are grouped together and are allocated to wireless channel 1 150 and near clients C and D 134 and 136 are grouped together and allocated to wireless channel 2 152, based upon similar power levels and similar data rates. As will be discussed, this grouping optimizes the total system utility of the wireless network 100.

As previously discussed, power levels are selected to maximize data rates for clients based on power requirements. Particularly, because the total emitted power may be limited due to regulatory requirements and/or for safety reasons, each channel may be assigned-to-transmit at a certain percentage of the original-maximum power level. In the present example, channel 1 150 and channel 2 152 are selected to transmit at 50% of the original maximum power level (of course this assumes that both channels have the same maximum power allowances). Of course, other allocations of transmit power are also possible.

In the present example, in the wireless network 100, far clients A and B 130 and 132 are grouped together and allocated to wireless channel 1 150 at a 50% power level. As shown in FIG. 4, client A is at a 50% power level corresponding to a 12 Mbps data rate (indicated by numeral 405) and client B is at a 50% power level corresponding to a 3 Mbps data rate (indicated by numeral 410). Further, in the present example, in the wireless network 100, near clients C and D 134 and 136 are grouped together and allocated to wireless channel 2 152 at a 50% power level. As shown in FIG. 4, client C is at a 50% power level corresponding to a 48 Mbps data rate (indicated by numeral 415) and client B is at a 50% power level corresponding to 36 Mbps (indicated by numeral 420). As will be discussed, this grouping optimizes the total system utility of the wireless network 100.

Figure 5:
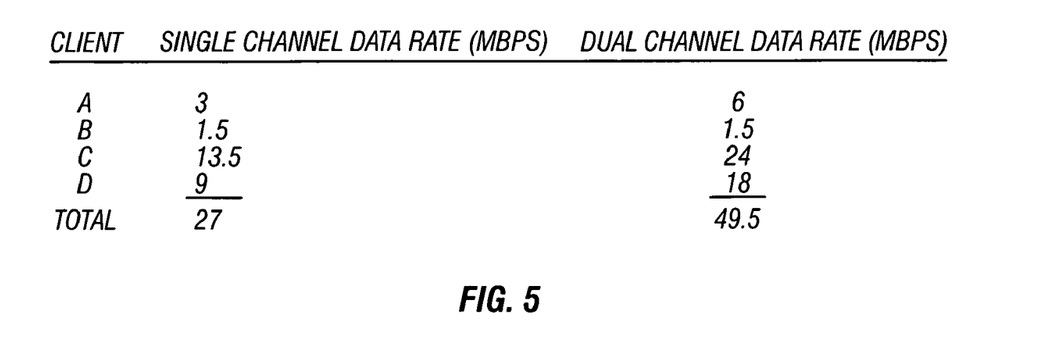
FIG. 5 illustrates a table showing the optimized dual channel data rates, for the exemplary wireless network.

With reference also to FIG. 5, FIG. 5 is a table 500 illustrating the optimized dual channel data rates (Mbps) for the exemplary wireless network 100. Hence, assuming the selected data rates vs. the selected transmission power level relationships of FIG. 4 (i.e. selections indicated by numerals 405, 410, 415, 420), FIG. 5 illustrates the optimized data rates brought about by allocating clients to different wireless channels to optimize total system utility based upon similar data rates and power levels for the wireless network 100.

Particularly, as shown in FIG. 5, far clients A and B (130 and 132) have transmit data rates along wireless channel 1 150 at 6 and 1.5 Mbps, respectively. It should be noted that since they both each equally share wireless channel 150 that their data rates are half of that indicated in FIG. 4. Further, near clients C and D (134 and 136) have transmit data rates along wireless channel 2 152 at 24 and 18 Mbps, respectively. Again, it should be noted that since they both each equally share wireless channel 152 that their data rates are half of that indicated in FIG. 4. Accordingly, the total data rate of data transmitted to clients A, B, C, and D, utilizing embodiments of the invention for allocating clients to different channels to optimize total system utility based upon similar data rates and power levels, results in dual wireless channels 1 and 2 150 and 152 transmitting data at 49.5 Mbps to clients A, B, C, and D. This is in comparison to standard single channel method, which only transmits data at 27 Mbps to clients A, B, C, and D. Hence, the total system utility of wireless network 100 has been optimized using embodiments of the present invention.

As should be appreciated by those skilled in the art, although the previously described example of the embodiments of the invention illustrate utilizing only a two channel system, that any number of multiple wireless channels may be used to optimize data rate transmissions throughout the wireless network. Further, these allocations of multiple different wireless channels with different data rates and power levels to optimize the system utility of the wireless network (i.e. the above procedures discussed in detail) may be done dynamically to periodically take into account changing wireless network conditions, such as, flat fading.

Moreover, the previously described embodiments of the invention may be particularly useful when the data rate decreases slower than decreasing power. This relationship typically holds true.

Additionally, because typically very high data rate clients are located near the transmitter and lower data rate clients are typically farther away from the transmitter, embodiments of the invention to allocate clients to different wireless channels to optimize the total system utility of the wireless network, based upon similar data rates and power levels, is a very worthwhile solution. This oftentimes results in grouping clients together in groups of near clients and far clients to optimize the total system utility of the wireless network.

As previously discussed, embodiments of the present invention may be implemented as a method, system, apparatus, or machine-readable medium (e.g. a software module, a processor readable medium, a computer readable medium, code segments, etc.) using standard programming and/or engineering techniques to produce software, firmware, hardware, middleware, or any combination thereof.

While the present invention and its various functional components have been described in particular embodiments, it should be appreciated the present invention can be implemented in hardware, software, firmware, middleware or a combination thereof and utilized in systems, subsystems, components, or sub-components thereof. When implemented in software, the elements of the present invention are the code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, etc.). Examples of the machine/processor-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

In particular, embodiments of the present invention can be generally implemented in a computer as one or more computer programs, to perform the desired operations, functions, and processes as previously described. The computer programs are comprised of instructions which when read and executed by the computer, cause the computer to perform the operations necessary to implement and/or use the present invention. Generally, the computer programs are tangibly embodied in and/or readable from a device, carrier, or media, such as memory, data storage devices, and/or a remote device coupled to the computer via data communication devices. Under control of the operating system, the computer programs may be loaded from memory, data storage devices, and/or remote devices into the memory of the computer for use during operations.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system for dynamically allocating wireless channels in a wireless network, the system comprising:
   at least two client devices, each client device to transceive wireless data over a wireless channel; and
   a server to transceive wireless data over at least one wireless channel, the server to:
      determine the number of client devices in the wireless network;
      allocate client devices to different wireless channels, wherein client devices that receive data at substantially different data rates are allocated to different wireless channels in order to optimize the total system utility of the wireless network; and
      estimate data rates at which client devices of the wireless network receive data for a plurality of different transmit power levels and, based on power level requirements, selecting at least one power level to maximize data rates to client devices for at least one wireless channel.

2. The system of claim 1, wherein the server allocates client devices that receive data at substantially similar data rates to the same wireless channel.

3. The system of claim 1, wherein the server, determines a plurality of wireless channels to accommodate the selected transmit power levels and data rates to client devices.

4. The system of claim 3, wherein the server, allocates client devices that receive data at substantially different data rates to different wireless channels and allocates client devices that receive data at substantially similar data rates to the same wireless channel.

5. The system of claim 1, wherein the server, groups client devices into near client devices that are relatively near to the server and far client devices that are relatively far from the server and allocates at least one wireless channel to the near client devices and at least one wireless channel to the far client devices.

6. The system of claim 1, wherein the server is coupled to at least one access point.

7. The system of claim 1, wherein each client device is coupled to at least one access point.

8. The system of claim 1, wherein the server is a home server for transmitting video and audio data streams to client devices over wireless channels.

9. The system of claim 1, wherein the server is further coupled to another network.

10. An apparatus for dynamically allocating wireless channels in a wireless network to at least two client devices, each client device to transceive wireless data over a wireless channel, the apparatus comprising:
   a transmitter to transceive wireless data over at least one wireless channel; and
   a processor to implement a software module to:
      determine the number of client devices in the wireless network;
      allocate client devices to different wireless channels, wherein client devices that receive data at substantially different data rates are allocated to different wireless channels in order to optimize the total system utility of the wireless network; and
      estimate data rates at which client devices of the wireless network receive data for a plurality of different transmit power levels and, based on power level requirements, selecting at least one power level to maximize data rates to client devices for at least one wireless channel.

11. The apparatus of claim 10, wherein the processor, allocates client devices that receive data at substantially similar data rates to the same wireless channel.

12. The apparatus of claim 10, wherein the processor, determines a plurality of wireless channels to accommodate the selected transmit power levels and data rates to client devices.

13. The apparatus of claim 12, wherein the processor, allocates client devices that receive data at substantially different data rates to different wireless channels and allocates client devices that receive data at substantially similar data rates to the same wireless channel.

14. The apparatus of claim 10, wherein the processor, groups client devices into near client devices that are relatively near to the server and far client devices that are relatively far from the server and allocates at least one wireless channel to the near client devices and at least one wireless channel to the far client devices.

15. The apparatus of claim 10, wherein the apparatus is coupled to at least one access point.

16. The apparatus of claim 10, wherein each client device is coupled to at least one access point.

17. The apparatus of claim 10, wherein the apparatus is a station of the wireless network.

18. The apparatus of claim 10, wherein the apparatus is a server.

19. The apparatus of claim 18, wherein the server is a home server for transmitting video and audio data streams to client devices over wireless channels throughout a home.

20. The apparatus of claim 10, wherein the apparatus is further coupled to another network.

21. A method for dynamically allocating wireless channels in a wireless network to at least two client devices, each client device to transceive wireless data over a wireless channel, the method comprising:
   transceiving wireless data over wireless channels to at least two client devices;
   determining the number of client devices in the wireless network;
   allocating client devices to different wireless channels, wherein client devices that receive data at substantially different data rates are allocated to different wireless channels in order to optimize the total system utility of the wireless network; and
   estimating data rates at which client devices of the wireless network receive data for a plurality of different transmit power levels and, based on power level requirements, selecting at least one power level to maximize data rates to client devices for at least one wireless channel.

22. The method of claim 21, further comprising allocating client devices that receive data at substantially similar data rates to the same wireless channel.

23. The method of claim 21, further comprising, determining a plurality of wireless channels to accommodate the selected transmit power levels and data rates to client devices.

24. The method of claim 23, further comprising:
   allocating client devices that receive data at substantially different data rates to different wireless channels; and
   allocating client devices that receive data at substantially similar data rates to the same wireless channel.

25. The method of claim 21, further comprising:
   grouping client devices into near client devices that are relatively near to the server and far client devices that are relatively far from the server; and
   allocating at least one wireless channel to the near client devices and at least one wireless channel to the far client devices.

26. A machine-readable medium storing tangibly embodied instructions which, when executed in a processing system, cause the system to perform a method for dynamically allocating wireless channels in a wireless network to at least two client devices, wherein each client device is to transceive wireless data over a wireless channel, comprising instructions for:
   transceiving wireless data over wireless channels to at least two client devices;
   determining the number of client devices in the wireless network;
   allocating client devices to different wireless channels, wherein client devices that receive data at substantially different data rates are allocated to different wireless channels in order to optimize the total system utility of the wireless network; and
   estimating data rates at which client devices of the wireless network receive data for a plurality of different transmit power levels and, based on power level requirements, selecting at least one power level to maximize data rates to client devices for at least one wireless channel.

27. The machine-readable medium of claim 26, further comprising allocating client devices that receive data at substantially similar data rates to the same wireless channel.

28. The machine-readable medium of claim 26, further comprising, determining a plurality of wireless channels to accommodate the selected transmit power levels and data rates to client devices.

29. The machine-readable medium of claim 28, further comprising:
   allocating client devices that receive data at substantially different data rates to different wireless channels; and
   allocating client devices that receive data at substantially similar data rates to the same wireless channel.

30. The machine-readable medium of claim 26, further comprising:
   grouping client devices into near client devices that are relatively near to the server and far client devices that are relatively far from the server; and
   allocating at least one wireless channel to the near client devices and at least one wireless channel to the far client devices.

* * * * *